Dec. 2, 1952 — L. S. PENNINGER — 2,619,759
FISHHOOK
Filed Oct. 28, 1949
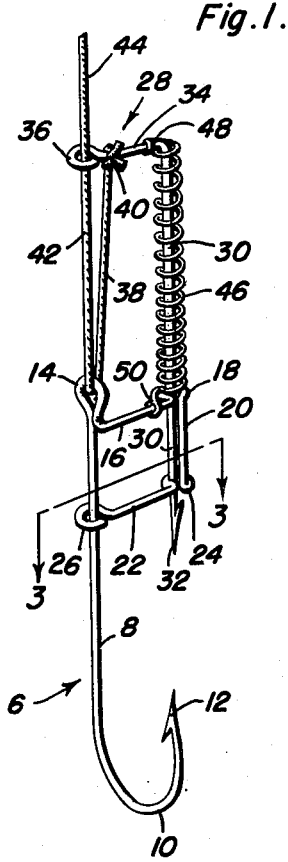
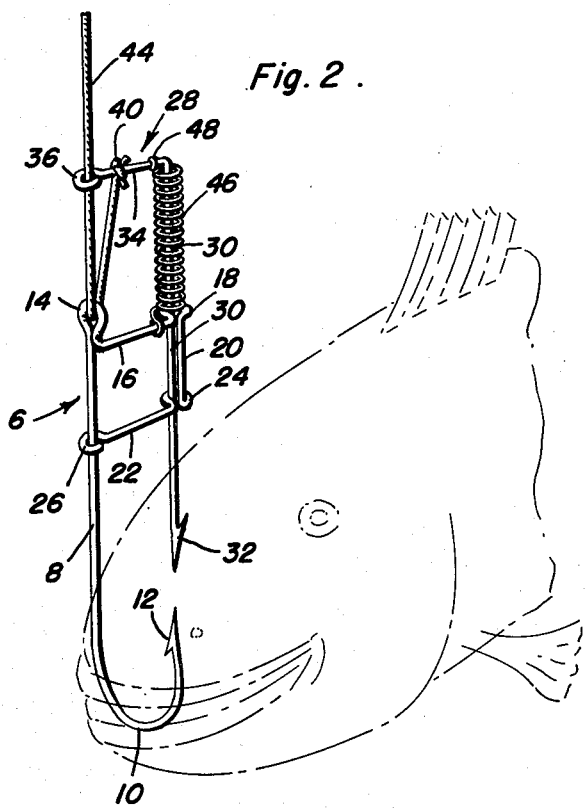
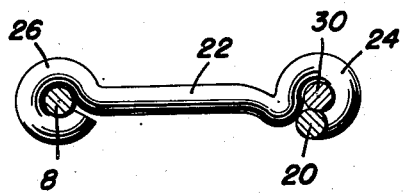
Luther S. Penninger
INVENTOR.

Patented Dec. 2, 1952

2,619,759

UNITED STATES PATENT OFFICE 2,619,759

FISHHOOK

Luther S. Penninger, Raleigh, N. C.

Application October 28, 1949, Serial No. 124,199

2 Claims. (Cl. 43—37)

This invention relates to certain new and useful improvements in angular's trap hooks wherein the usual type primary hook has a secondary complemental trap hook cooperable therewith, the latter being operated by the pull of the captive fish against the tension of the fishing line.

More specifically, the invention has to do with a trap hook which is slidable on a primary or main hook, said trap hook being in the form of a projectile spear which, when brought into play, "harpoons" the victim and holds it securely for easy and effective landing.

In carrying out the principles of the invention a novel construction is employed in which manufacturers, retailers and users will find their needs and ordinary requirements fully met, contained and conveniently available.

Briefly summarized, a preferred embodiment of the invention is characterized by a primary unit embodying a shank having a fish hook at one end, a line eye at the other end, and novel guide means characterized by a pair of laterally extending spaced parallel portions provided with guide eyes formed integral with said shank, a secondary unit embodying an L-shaped member having a long limb slidable through said guide eyes and a short limb, the latter being provided with a line eye in alignment with said first named line eye, said long limb being provided with a spear in operable alignment with said fish hook, and a fishing line attached at one end to said short limb with the adjacent end portion passing through said line eyes.

The overall object of this invention is to structurally, functionally and otherwise improve on prior art trap hooks in the field of endeavor under consideration by providing a construction which is simple, practical, reliable and aptly and amply suited to satisfactorily attain expected and wanted ends.

Another object of the invention is to provide the aforementioned primary and secondary units wherein the primary unit is fashioned from a single length of wire or equivalent material with the upward end of the shank especially and peculiarly bent upon itself to define a line eye in alignment with the shank and spear accommodating and guide eyes in alignment with each other but offset in respect to said shank.

Then, too, novelty is predicated on the secondary unit of L-shaped form with the short limb terminating in a second line eye which is properly lined up with the first named line eye on the primary unit, whereby to provide satisfactory anchorage for the fishing line.

Other objects and advantages will become more readily apparent with the following description and the accompanying illustrative drawing.

In the accompanying sheet of drawings, wherein like numerals are employed to designate like parts throughout the views:

Fig. 1 is a perspective view of a trap-type fishing hook constructed in accordance with the principles of the present invention and showing the parts in their normal relationship.

Fig. 2 is likewise a perspective view based on Fig. 1 but showing how, when a pull is exerted on the main hook, the barbed spear comes into play.

Fig. 3 is a cross section, on an enlarged scale, taken on the plane of the line 3—3 of Fig. 1, looking in the direction of the arrows.

The primary unit is denoted by the numeral 6 and as stated is formed from a single length of wire or the like whose shank portion 8 is linearly straight, the downward end thereof being formed into a conventional type fish hook 10 terminating in a common barb 12. Near the upward end the shank is bent upon itself as at 14 to form a line eye and is then bent laterally at 16 and fashioned into a guide eye 18. The terminal portion of the wire is then bent as at 20 and 22, the portion 20 being parallel to the shank and the portion 22 at right angles to the shank but parallel to the first named bend 16. In bending these portions of the wire the formation is such as to define a second guide eye 24 in alignment with the guide eye 18. Then, there is a terminal eye 26 which anchors the portion 22 to the shank 8.

The second unit, which is relatively movable in respect to the first unit 8, is denoted by the numeral 28 and, as previously stated, is of general L-shaped form. The long limb 30 is straight from end to end and has a portion slidably mounted in the guide eyes 18 and 24. The free end is formed with a spear or barb 32 which is constrained by the eyes 24 and 18 to move into approximate alignment with the barb 12. The short limb 34 terminates in an eye 36 which is a line eye and which is in alignment with the first named line eye 14. The fishing line has one end portion 38 tied or otherwise anchored at 40 on the short limb. The other end portion 42 passes slidably through the line eyes 14 and 36 and the portion 44 leads back to the hands of the angler, in obvious fashion.

The coiled return spring 46 surrounds a portion of the long limb 30 and is anchored at 48 on the short limb. The opposite end is anchored at 50 on the aforementioned lateral bend 16. The spring is possessed of inherent resiliency which causes it to expand and normally hold the unit 28 in a retracted ready-to-operate position.

In practice, when the fish takes the hook "in" and exerts a pull against the tension of the line, the spear moves downwardly or toward the hook 10 in "harpoon-like" fashion. It follows, therefore, that the barb 32 penetrates the fish somewhat in the manner shown in full and dotted lines in Fig. 2. When the fish is removed from the hooks, unit 28 is freed and the spring 46 comes into play and returns the part to normal relationship, depicted in Fig. 1. Using two guide eyes 18 and 24, the action of the spear or unit 28 is positive and by using a return spring the spear is not only automatically returned to the position shown in Fig. 1 but the barbs 12 and 32 are held at a safe distance from one another.

A careful consideration of the foregoing description in conjunction with the invention as illustrated in the drawings will enable the reader to obtain a clear understanding and impression of the alleged features of merit and novely sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A fish hook construction of the class described comprising a primary unit formed from a single length of wire embodying a shank having a fish hook at one end and a line eye at the opposite end, that portion of the wire adjacent to said line eye being bent laterally and extending at right angles from said shank, being bent upon itself to provide a guide eye, further bent beyond said guide eye with the bend at right angles to the first-named bend and parallel to said shank, being formed into a second guide eye in longitudinally spaced alignment with said first-named guide eye, and having its terminal portion bent toward said shank in a direction at right angles to the shank and connected with the shank at a point spaced inwardly from said line eye, a secondary unit embodying an L-shaped member having a long limb bridging the space between said guide eyes and slidable through said guide eyes and further including a short limb at right angles to the long limb, said short limb having a line eye in alignment with the first-named line eye, said long limb being provided with a spear in operable alignment with said fish hook, a fishing line attached at one end to said short limb with its adjacent end portion passing through said line eyes, and a coil spring surrounding a portion of said long limb, one end of said spring being connected with the short limb and the other end of the spring being connected with one of the stated guide eyes.

2. A fish hook construction comprising a fish hook embodying a shank having a hook at one end and a line eye at its opposite end, guide means integral with said shank adjacent to said line eye including a first portion extending at right angles from said shank and terminating in a guide eye, a second portion at right angles to said shank and in spaced parallelism with said first portion and having a guide eye independent of said first guide eye and in axial alignment with the latter, a third portion interconnecting said first and second portions and at right angles to the latter and parallel with said shank, an L-shaped member having a long limb bridging the space between said guide eyes and slidable through said guide eyes and further including a short limb having a line eye in alignment with the first-named line eye, said long limb being provided with a spear in operable alignment with said hook and a coil spring surrounding a portion of said long limb, one end of said spring being connected with said short limb, the other end of said spring being connected with one of said guide eyes.

LUTHER S. PENNINGER.

REFERENCES CITED

The following references are of record in the file of this patent:

UNITED STATES PATENTS

| Number | Name | Date |
| --- | --- | --- |
| 611,400 | Wenger | Sept. 27, 1898 |
| 1,604,725 | Sprangel | Oct. 26, 1926 |
| 2,244,271 | Voigt | June 3, 1941 |
| 2,260,923 | Thompson | Oct. 28, 1941 |